(12) United States Patent
Sato

(10) Patent No.: US 10,420,142 B2
(45) Date of Patent: Sep. 17, 2019

(54) TERMINAL DEVICE, BASE STATION, AND PROGRAM

(71) Applicant: Sony Corporation, Tokyo (JP)

(72) Inventor: Masanori Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 15/308,533

(22) PCT Filed: Mar. 23, 2015

(86) PCT No.: PCT/JP2015/058697
§ 371 (c)(1),
(2) Date: Nov. 2, 2016

(87) PCT Pub. No.: WO2015/194222
PCT Pub. Date: Dec. 23, 2015

(65) Prior Publication Data
US 2017/0055292 A1 Feb. 23, 2017

(30) Foreign Application Priority Data

Jun. 17, 2014 (JP) .................................. 2014-123973

(51) Int. Cl.
*H04W 74/08* (2009.01)
*H04W 72/08* (2009.01)
*H04W 74/00* (2009.01)

(52) U.S. Cl.
CPC ....... *H04W 74/0816* (2013.01); *H04W 72/08* (2013.01); *H04W 74/002* (2013.01)

(58) Field of Classification Search
CPC ............. H04W 84/12; H04W 74/0808; H04W 74/0816; H04W 72/082; H04W 28/18; H04W 74/085; H04B 17/318; H04L 43/16; H04L 5/006
See application file for complete search history.

(56) References Cited

U.S. PATENT DOCUMENTS

2006/0046739 A1\* 3/2006 Blosco .................. H04W 28/18
455/453
2007/0214247 A1\* 9/2007 Yang ....................... H04L 12/66
709/223
2009/0247182 A1\* 10/2009 Tamate ............... H04W 72/082
455/452.2

FOREIGN PATENT DOCUMENTS

| JP | 2008-17337 A | 1/2008 |
| JP | 2008-42383 A | 2/2008 |
| JP | 2013-175940 A | 9/2013 |

OTHER PUBLICATIONS

International Search Report dated May 26, 2015 in PCT/JP15/058697 Filed Mar. 23, 2015.

\* cited by examiner

*Primary Examiner* — Mansour Oveissi
(74) *Attorney, Agent, or Firm* — Xsensus LLP

(57) ABSTRACT

[Object] To provide a mechanism of carrier sense considering the influence of not only the own network but also other networks in a wireless communication system.

[Solution] Provided is a terminal device, including: a wireless communication unit that performs communication with a base station that forms a first wireless network; a carrier sense unit that performs carrier sense with another device; and a control unit that controls a signal detection threshold so that another terminal device belonging to a second wireless network different from the first wireless network is outside a signal detection range, based on a carrier sense result by the carrier sense unit.

20 Claims, 14 Drawing Sheets

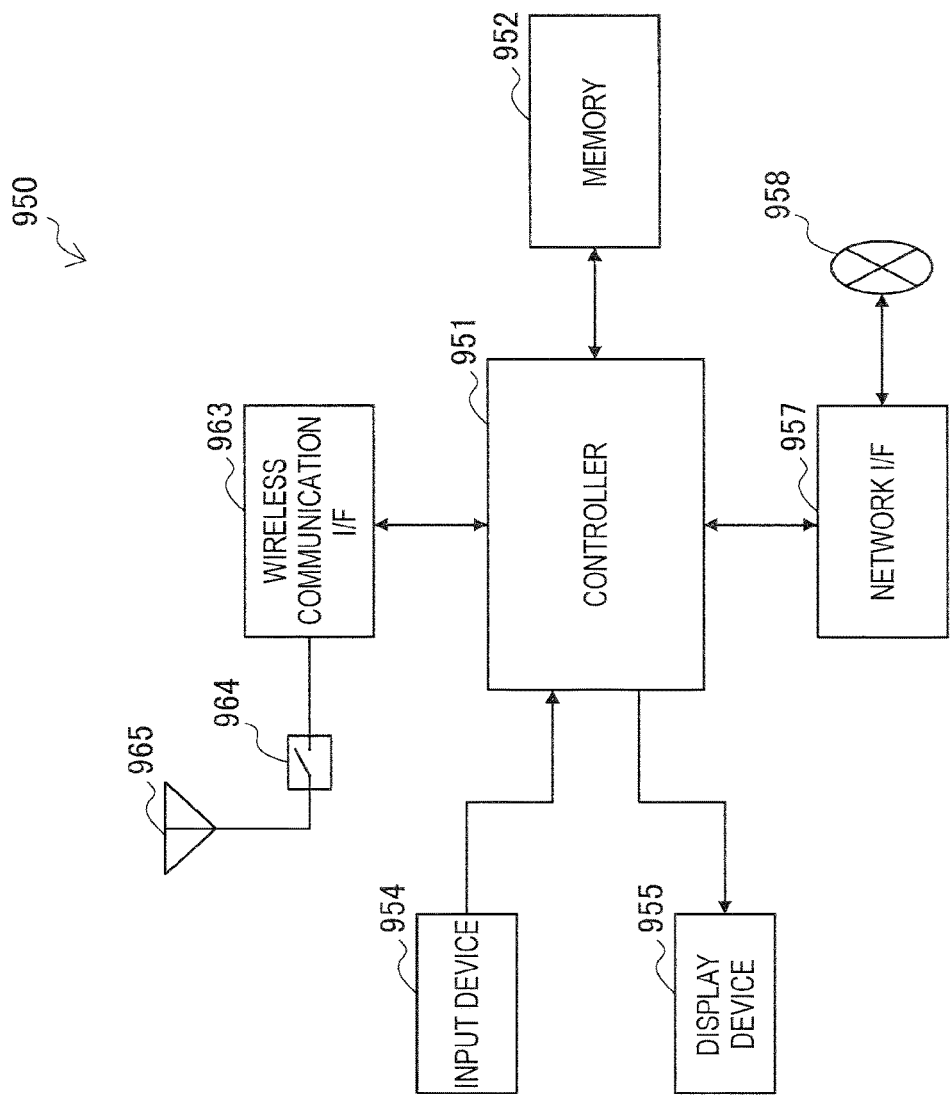

TERMINAL DEVICE, BASE STATION, AND PROGRAM

TECHNICAL FIELD

The present disclosure relates to a terminal device, a base station, and a program.

BACKGROUND ART

In a wireless communication system, carrier sense is performed as one of technologies for avoiding collision. The carrier sense is processing to confirm that another terminal does not perform transmission in a frequency channel used. A terminal performs wireless transmission when another terminal does not perform transmission, while it suppresses wireless transmission when another terminal performs transmission. The wireless communication system uses the carrier sense to avoid interference due to wireless transmission performed by a plurality of terminals using the same wireless resource (frequency, time).

When the interference occurs, a terminal on the reception side receives desired signals and interference signals at the same time, and a signal-to-noise (SN) ratio is reduced. When the SN ratio is reduced excessively, the reception of desired signals becomes difficult and, consequently, wireless communication becomes difficult. Then, the technology of avoiding interference using carrier sense is developed.

For example, the following Patent Literature 1 discloses a technology in which a base station in a wireless local area network (LAN) controls signal detection thresholds of belonging terminals so that the belonging terminals detect each other to avoid a hidden terminal problem.

CITATION LIST

Patent Literature

Patent Literature 1: JP 2008-17337A

SUMMARY OF INVENTION

Technical Problem

However, the technology in the above-described Patent Literature 1 does not consider the existence of networks other than a network formed by the base station. In today's spread and concentration of wireless communication systems, it is assumed that another network adjacent to or overlapping the own network exists. Thus, it is desirable to provide a mechanism of carrier sense considering the influence of not only the own network but also other networks.

Solution to Problem

According to the present disclosure, there is provided a terminal device, including: a wireless communication unit that performs communication with a base station that forms a first wireless network; a carrier sense unit that performs carrier sense with another device; and a control unit that controls a signal detection threshold so that another terminal device belonging to a second wireless network different from the first wireless network is outside a signal detection range, based on a carrier sense result by the carrier sense unit.

According to the present disclosure, there is provided a base station, including: a wireless communication unit that forms a first wireless network and performs communication with a terminal device; and a control unit that transmits as a reply, through the wireless communication unit, a threshold change response for changing a signal detection threshold so that a second terminal device belonging to a second wireless network different from the first wireless network is outside a signal detection range of a first terminal device, based on a threshold change request received from the first terminal device belonging to the first wireless network.

According to the present disclosure, there is provided a program that causes a computer to function as a wireless communication unit that performs communication with a base station that forms a first wireless network; a carrier sense unit that performs carrier sense with another device; and a control unit that controls a signal detection threshold so that another terminal device belonging to a second wireless network different from the first wireless network is outside a signal detection range, based on a carrier sense result by the carrier sense unit.

According to the present disclosure, there is provided a program that causes a computer to function as: a wireless communication unit that forms a first wireless network and performs communication with a terminal device; and a control unit that transmits as a reply, through the wireless communication unit, a threshold change response for changing a signal detection threshold so that a second terminal device belonging to a second wireless network different from the first wireless network is outside a signal detection range of a first terminal device, based on a threshold change request received from the first terminal device belonging to the first wireless network.

Advantageous Effects of Invention

As described above, the present disclosure enables carrier sense considering the influence of not only the own network but also other networks.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is a block diagram showing an example of a schematic configuration of a wireless access point.

DESCRIPTION OF EMBODIMENT(S)

Figure 1:
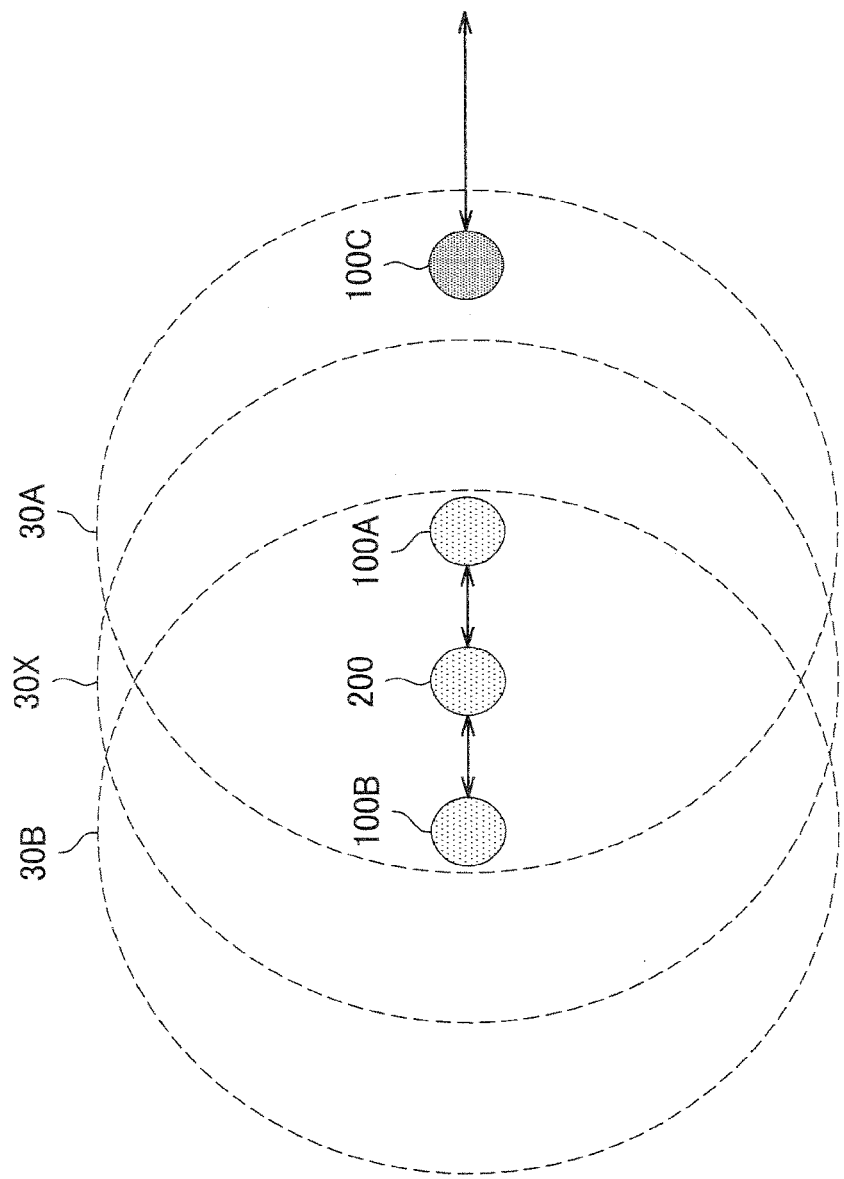
FIG. 1 is an explanatory diagram for explaining the outline of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, in this specification and the appended drawings, structural elements that have substantially the same function and structure may be distinguished with different alphabets following the same reference numeral. For example, a plurality of structural elements that have substantially the same function and structure are distinguished as terminal devices 100A, 100B, and 100C, if necessary. However, when it is unnecessary to distinguish each of a plurality of structural elements that have substantially the same function and structure, they are denoted with only the same reference numeral. For example, when it is unnecessary to particularly distinguish the terminal devices 100A, 100B, and 100C, the terminal devices are simply referred to as the terminal device(s) 100.

The description will be given in the following order.
1. Overview
2. First embodiment
2-1. Configuration example of terminal device
2-2. Configuration example of base station
2-3. Example of operation processing
3. Second embodiment
3-1. Configuration example of terminal device
3-2. Configuration example of base station
3-3. Example of operation processing
4. Application example
5. Conclusion <1. Overview>

First, the overview of a communication system 1 according to an embodiment of the present disclosure will be described with reference to FIG. 1.

FIG. 1 is an explanatory diagram for explaining the outline of the communication system 1 according to an embodiment of the present disclosure. As shown in FIG. 1, the communication system 1 of the embodiment includes a plurality of terminal devices 100 (that is, terminal devices 100A, 100B, and 100C), and a base station 200. The communication system 1 is a system conforming to a wireless LAN or a communication standard equivalent thereto, for example.

The terminal devices 100 of the communication system 1 can belong to (be connected wirelessly to) different networks. For example, the terminal device 100A, the terminal device 100B, and the base station 200 form a single wireless network. This network has a star-type network structure in which each of the terminal devices 100A and 100B is connected wirelessly to the base station 200. Meanwhile, the terminal device 100C is connected wirelessly to another base station not shown. That is, the terminal device 100C is a terminal forming a network different from the network to which the terminal devices 100A and 100B belong. In FIG. 1, the base station 200 and the terminal devices 100 connected wirelessly are linked by arrows. For the base station 200, wireless signals from the terminal devices 100A and 100B are desired signals, and wireless signals from the terminal device 100C are interference signals.

Moreover, circular broken lines shown in FIG. 1 indicate signal detection ranges 30 of the devices. FIG. 1 shows a signal detection range 30X of the base station 200, a signal detection range 30A of the terminal device 100A, and a signal detection range 30B of the terminal device 100B, for example. When another terminal in the signal detection range 30 performs wireless transmission, each device can detect the signals.

Here, with the positional relation shown in FIG. 1, transmission suppression by carrier sense may be performed excessively.

For example, the terminal device 100C is positioned in the signal detection range 30A, and thus when the terminal device 100C performs wireless transmission, the terminal device 100A suppresses wireless transmission by carrier sense. However, even if the terminal devices 100A and 100C perform wireless transmission at the same time, the base station 200 on the reception side can succeed in receiving desired signals from the terminal device 100A. This is because the terminal device 100A is closer to the base station 200 than the terminal device 100C, whereby the signal intensity of desired signals received by the base station 200 is higher than the signal intensity of interference signals. Thus, the base station 200 can demodulate desired signals from the terminal device 100A without excessive reduction of the SN ratio.

In this manner, even when desired signals can be demodulated, transmission opportunities may be lost excessively due to transmission suppression by carrier sense. For example, in the example shown in FIG. 1, transmission opportunities of the terminal device 100A may be lost excessively, reducing the throughput of the whole system 1.

In view of the above aspects, the communication system 1 according to an embodiment of the present disclosure has been made. The communication system 1 of the embodiment can prevent excessive transmission suppression by carrier sense in the situation where transmission suppression is unnecessary. Particularly, the embodiment provides a mechanism for preventing excessive transmission suppression due to a terminal belonging to another network, such as an example shown in FIG. 1.

<2. First embodiment>

[2-1. Configuration Example of Terminal Device]

Figure 2:
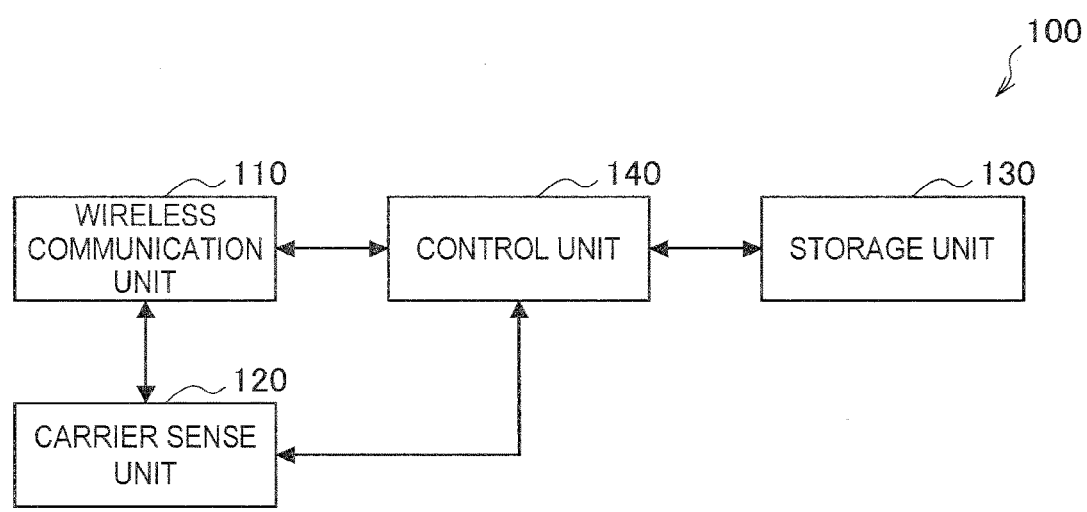
FIG. 2 is a block diagram showing an example of a logical configuration of a terminal device according to a first embodiment.

FIG. 2 is a block diagram showing an example of a logical configuration of the terminal device 100 according to the embodiment. As shown in FIG. 2, the terminal device 100 includes a wireless communication unit 110, a carrier sense unit 120, a storage unit 130, and a control unit 140.

(1) Wireless Communication Unit 110

The wireless communication unit 110 transmits and receives wireless signals. For example, the wireless communication unit 110 performs wireless communication with the base station 200. To be more specific, the wireless communication unit 110 transmits uplink signals to the base station 200, and receives downlink signals from the base station 200. The wireless communication unit 110 may have functions of an analog processing unit, an analog-to-digital/digital-to-analog (AD/DA) conversion unit, and the like.

For example, the wireless communication unit 110 of the embodiment performs communication with the base station 200 forming a wireless network (first wireless network). As described later in detail, the wireless communication unit 110 transmits a threshold change request output from the control unit 140 to the base station 200, receives a threshold change response transmitted as a reply from the base station 200, and outputs it to the control unit 140. Moreover, the wireless communication unit 110 receives a threshold change notification, and outputs it to the control unit 140. The threshold change request is a message for requesting the order for changing a signal detection threshold. The threshold change response is a message responding to a threshold change request for making the order for changing or not changing a threshold. The threshold change notification is a message for notifying that a signal detection threshold of any of the terminal devices 100 of the base station 200 is changed.

(2) Carrier Sense Unit 120

The carrier sense unit 120 has a function of performing carrier sense with another device. For example, the carrier sense unit 120 performs measurement in a time zone and a frequency band used by the wireless communication unit 100 for wireless transmission. The carrier sense unit 120 may measure reception signal intensity or measure an SN ratio. Then, the carrier sense unit 120 compares the measurement result with a signal detection threshold to determine the state of a network. For example, the carrier sense unit 120 determines that the network is in a busy state when the measurement result exceeds the signal detection threshold, and determines that the network is in an idle state when the measurement result does not exceed the signal detection threshold. The busy state is a state in which another terminal device 100 or the base station 200 in the signal detection range 30 is performing wireless transmission. The idle state is a state in which another terminal device 100 or the base station 200 in the signal detection range 30 is not performing wireless transmission.

In the embodiment, the control unit 140 described later sets a signal detection threshold. As the signal detection threshold is increased, the signal detection range 30 becomes small. As the signal detection threshold is reduced, the signal detection range 30 becomes large. In the embodiment, based on the control of the control unit 140, the signal detection threshold can be changed dynamically, and the signal detection range 30 can be changed dynamically.

The carrier sense unit 120 may perform carrier sense periodically with given time intervals, or perform carrier sense following the order by the control unit 140. The carrier sense unit 120 outputs information of the determination result indicating whether the network is in a busy state or an idle state to the control unit 140.

(3) Storage Unit 130

The storage unit 130 is a part that records and reproduces data on a given recording medium. The storage unit 130 is realized by a hard disc drive (HDD), for example. The recording medium can be a solid memory such as a flash memory, a memory card with an embedded solid memory, an optical disc, a magneto-optical disc, a hologram memory, and the like. The storage unit 130 only needs to have a configuration allowing recording and reproduction in accordance with an adopted recording medium.

For example, the storage unit 130 stores a default signal detection threshold. In addition, the storage unit 130 may store information related to carrier sense by the carrier sense unit 120.

(4) Control Unit 140

The control unit 140 functions as an operation processing device and a control device, and controls the whole operation of the terminal device 100 in accordance with various programs. The control unit 140 is realized by an electronic circuit such as a central processing unit (CPU) and a microprocessor, for example. Note that the control unit 140 may include a read only memory (ROM) that stores programs and operation parameters used, and a random access memory (RAM) that temporarily stores parameters varying appropriately, and the like.

For example, the control unit 140 has a function of permitting or suppressing wireless transmission by the wireless communication unit 110 based on a carrier sense result. To be more specific, the control unit 140 permits transmission when the network is in an idle state, and suppresses transmission when the network is in a busy state.

When interference signals exceeding a signal detection threshold have been received by carrier sense before data transmission, the control unit 140 suppresses the data transmission. Here, the control unit 140 counts the number of times of transmission suppression or records identification information of another terminal device 100 that is a transmission origin of the interference signals. For example, the control unit 140 associates time information of transmission suppression with identification information of another terminal device 100 that is a transmission origin of the interference signal, and store the information in the storage unit 130. In the following, the terminal device that is a transmission origin of interference signals is also referred to as an interference terminal.

Note that the wireless signals detected by carrier sense include interference signals and, further, desired signals transmitted to the own terminal. When wireless signals exceeding a signal detection threshold have been received by carrier sense, the control unit 140 first controls the wireless communication unit 110 to demodulate the wireless signals. When the destination is the own terminal, as a result of demodulation, the control unit 140 determines that the received wireless signals are desired signals. In this case, the control unit 140 obtains data included in the desired signals, for example. On the other hand, when the destination is not the own terminal, as a result of demodulation, the control unit 140 determines that the received wireless signals are interference signals.

For example, the control unit 140 has a function of controlling, based on a carrier sense result by the carrier sense unit 120, a signal detection threshold so that another terminal device 100 belonging to another wireless network is outside a signal detection range. To be more specific, the control unit 140 first monitors a carrier sense result output from the carrier sense unit 120, and controls the wireless communication unit 110 to transmit a threshold change request to the base station 200. Note that another wireless network indicates a wireless network (second wireless network) formed by another base station 200, which is different from a wireless network (first network) formed by the base station 200 with which the terminal device 100 performs communication.

For example, the control unit 140 controls the wireless communication unit 110 to transmit a threshold change request to the base station 200 with a trigger that an index related to transmission suppression by carrier sense has exceeded a given threshold. The index can be the number of times of transmission suppression by carrier sense, for example. The present specification supposes that the control unit 140 counts the number of times of transmission suppression for each wireless frame, and transmits a threshold change request when the number of times has exceeded a given value. When the base station 200 permits the change of a threshold, and the signal detection threshold is increased, another terminal transmitting interference signals becomes outside the signal detection range 30. Thus, the carrier sense unit 120 determines an idle state, which allows transmission of a wireless frame subjected to transmission suppression. As another example of the index, the control unit 140 may transmit a threshold change request with a trigger that the frequency or the ratio of transmission suppression has exceeded a given value or that the transmission data stored in a transfer buffer due to transmission suppression has exceeded a given value, regarding a plurality of wireless frames, for example.

The threshold change request may include a carrier sense result by the carrier sense unit 120, for example. The threshold change request may include the number of times of transmission suppression, identification information of an interference terminal, or information indicating a measurement result of the reception signal intensity of interference signals that is measured by the carrier sense unit 120. In addition, the threshold change request may include information indicating the importance of data subjected to transmission suppression by carrier sense. The importance is supposed to be higher as permitted transmission delay is shorter. For example, the importance of video streaming data may be high, while the importance of web traffic such as a hypertext transfer protocol (HTTP) may be low.

Moreover, the control unit 140 changes a signal detection threshold at the carrier sense unit 120 based on a threshold change response transmitted from the base station 200 as a response to a threshold change request, for example. The threshold change response may include, for example, information indicating whether the change of a threshold is permitted and information indicating a setting value of a signal detection threshold to be set when the change is permitted. The setting value may be, for example, information indicating an upper limit value or a lower limit value of a variable signal detection threshold, and the control unit 140 may change, in such a range, a signal detection threshold so that an interference terminal is outside the signal detection range. A setting example of the signal detection threshold by the control unit 140 will be described with reference to FIG. 3.

Figure 3:
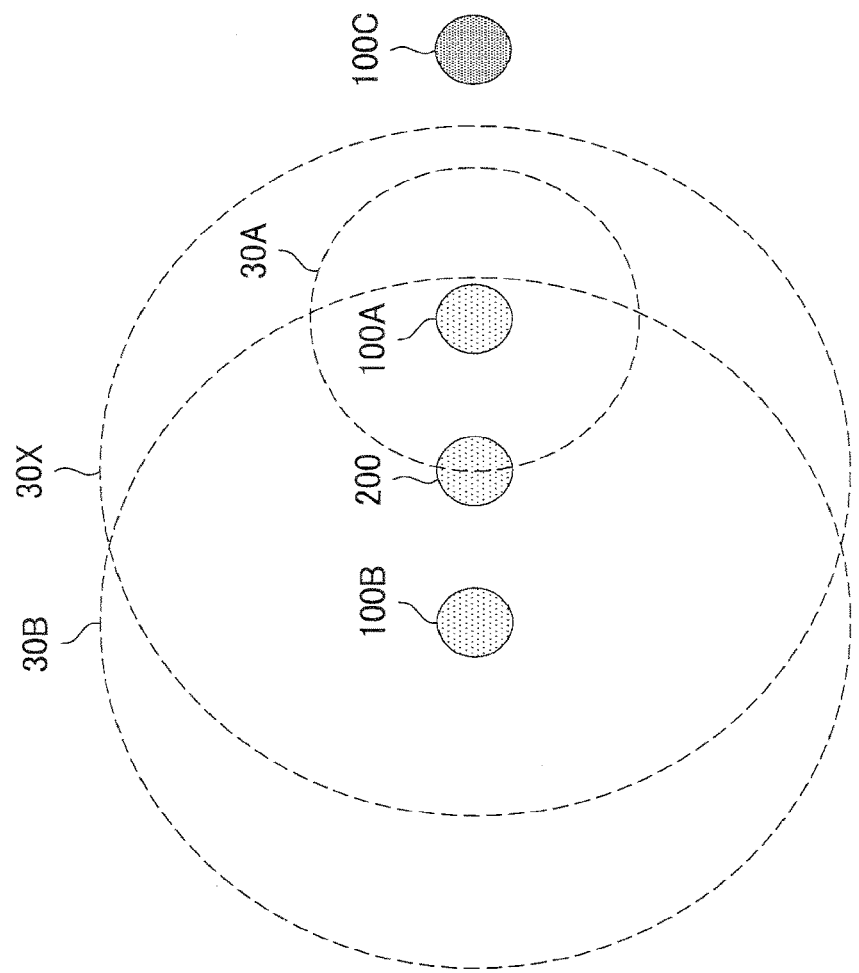
FIG. 3 is an explanatory diagram for explaining an example of the change of a signal detection threshold in a communication system according to the first embodiment.

FIG. 3 is an explanatory diagram for explaining an example of the change of a signal detection threshold in the communication system 1 according to the first embodiment. FIG. 3 shows an example of the case in which a threshold change request from the terminal device 100A is permitted. As shown in FIG. 3, the terminal device 100A increases a signal detection threshold to make the signal detection range 30A smaller than that of FIG. 1. Thus, the terminal device 100C that is an interference terminal becomes outside the signal detection range 30A. Consequently, even when the terminal device 100C performs wireless transmission using the same wireless resource, the terminal device 100A determines the idle state, thus avoiding suppression of wireless transmission. The setting example of a signal detection threshold has been described above.

The control unit 140 changes a signal detection threshold based on a threshold change response, regarding data transmission as a trigger for the threshold change request. As described above, the control unit 140 transmits a threshold change request for a single wireless frame. When the threshold change request is permitted, the control unit 140 changes a signal detection threshold for charrier sense for this wireless frame. The control unit 140 may undo the change after the wireless frame as a trigger is transmitted. This prevents excessive increase of transmission opportunities of the terminal device 100. In addition, the control unit 140 may also transmit the subsequent wireless frames while maintaining the changed signal detection threshold. This reduces redundant processing of the terminal device 100 for transmitting a threshold change request every time a wireless frame is transmitted.

The configuration example of the terminal device 100 according to the embodiment has been described above. Next, a configuration example of the base station 200 according to the embodiment will be described with reference to FIG. 4.

[2-2. Configuration Example of Base Station]

Figure 4:
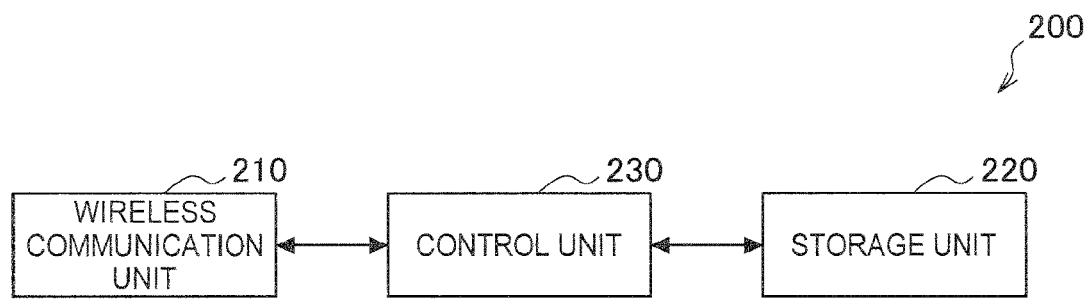
FIG. 4 is a block diagram showing an example of a logical configuration of a base station according to the first embodiment.

FIG. 4 is a block diagram showing an example of a logical configuration of the base station 200 according to the embodiment. As shown in FIG. 4, the base station 200 includes a wireless communication unit 210, a storage unit 220, and a control unit 230.

(1) Wireless Communication Unit 210

The wireless communication unit 210 transmits and receives wireless signals. For example, the wireless communication unit 210 performs wireless communication with the terminal device 100. To be more specific, the wireless communication unit 210 transmits downlink signals to the terminal device 100, and receives uplink signals from the terminal device 100. The wireless communication unit 210 may have functions of an analog processing unit, an AD/DA conversion unit, and the like.

The wireless communication unit 210 of the embodiment forms a wireless network (first wireless network) and performs communication with the terminal devices 100 belonging to the network. The wireless communication unit 210 receives a threshold change request from the terminal device 100, outputs it to the control unit 230, and transmits as a reply a threshold change response output from the control unit 230 to the terminal device 100 as a transmission origin of the threshold change request. Moreover, the wireless communication unit 210 transmits a threshold change notification output from the terminal device 100 to the terminal devices 100 belonging to the wireless network.

(2) Storage Unit 220

The storage unit 220 is a part that records and reproduces data on a given recording medium. The storage unit 220 is realized by an HDD, for example. The recording medium can be a solid memory such as a flash memory, a memory card with an embedded solid memory, an optical disc, a magneto-optical disc, a hologram memory, and the like. The storage unit 220 only needs to have a configuration allowing recording and reproduction in accordance with an adopted recording medium.

For example, the storage unit 220 stores a range of a signal detection threshold that can be set by the terminal device 100. Moreover, the control unit 230 may store the reception signal intensity at the wireless communication unit 210 regarding wireless signals received from terminals including an interference terminal belonging to another wireless network.

(3) Control Unit 230

The control unit 230 functions as an operation processing device and a control device, and controls the whole operation of the base station 200 in accordance with various programs. The control unit 230 is realized by an electronic circuit such as a CPU and a microprocessor, for example. Note that the control unit 230 may include a ROM that stories programs and operation parameters used, and a RAM that temporarily stores parameters varying appropriately, and the like.

Based on a threshold change request received from the first terminal device 100 belonging to the own wireless network (first network), the control unit 230 has a function of controlling the second terminal device 100 belonging to a different wireless network (second wireless network) to be outside the signal detection range of the first terminal device 100. The control unit 230 determines whether the change of a threshold is permitted based on various kinds of information regarding the threshold change request received from the terminal device 100. Then, when the change of a threshold is permitted, the control unit 230 transmits as a reply a threshold change response for changing the signal detection threshold of the terminal device 100 to a transmission origin of the threshold change request. Thus, the terminal device 100 that is a transmission origin of the threshold change request can change the signal detection threshold.

The control unit 230 permits the change of a threshold when at least one of the following conditions is fulfilled, for example. Note that in the present specification, the explanation will be given assuming that the control unit 230 permits the change of a threshold when all of the following conditions are fulfilled.

For example, one of the conditions is that a terminal reported as an interference terminal in the threshold change request is not a belonging terminal. Note that belonging indicates belongingness to a wireless network (first wireless network) formed by the own. The control unit 230 determines whether the identification information reported as identification information of the interference terminal is of the terminal device 100 connected to the base station 200 itself so as to determine whether this condition is fulfilled. This condition allows the base station 200 to restrict terminals to be outside the signal detection range of the terminal device 100 that is a transmission origin of a threshold change request, to the terminal devices 100 belonging to other wireless networks. Moreover, the base station 200 can avoid the situation in which the belonging terminal devices 100 mutually control themselves to be outside the signal detection range, thus preventing interference in the own wireless network.

For example, one of the conditions set be the control unit 230 is that all of the terminal devices 100 belonging to the own wireless network have higher reception signal intensity at the wireless communication unit 210 than an interference terminal. The control unit 230 measures the reception signal intensity of wireless signals transmitted from each terminal, which are received at the wireless communication unit 210, so as to determine whether this condition is fulfilled based on the reception signal intensity. For example, the control unit 230 determines that this condition is fulfilled when the belonging terminal device 100 having lower reception signal intensity than the interference terminal does not exist. Meanwhile, the control unit 230 determines that this condition is not fulfilled when the belonging terminal device 100 having lower reception signal intensity than the interference terminal exists. For example, in the positional relation shown in FIG. 1, the terminal device 100C has the farthest distance to the base station 200. Thus, the reception signal intensity of interference signals from the terminal device 100C is lower than the reception signal intensity from the terminal devices 100A and 100B. In this case, the control unit 230 determines that the conditions are fulfilled. Note that the control unit 230 may store/update measurement results of the reception signal intensity from the terminals including interference terminals in the storage unit 220. The control unit 230 may determine the condition based on past measurement results referring to the storage unit 220.

Here, this condition will be described in detail with reference to FIG. 5.

Figure 5:
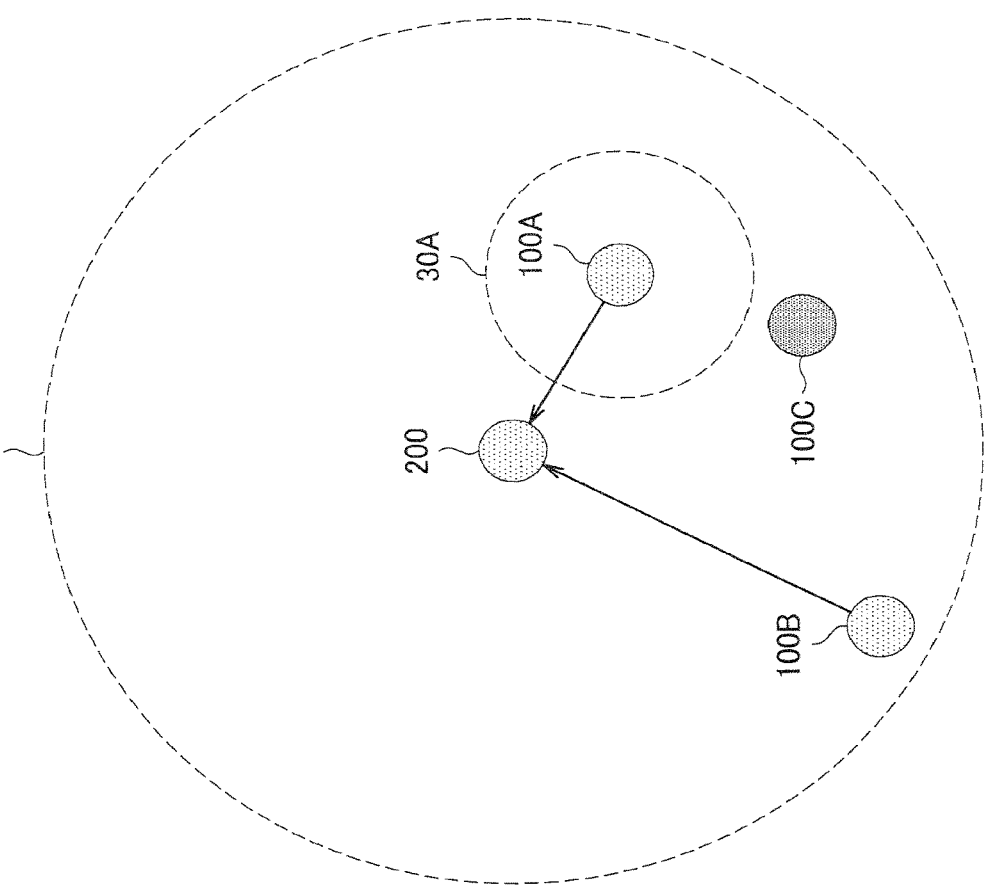
FIG. 5 is an explanatory diagram for explaining an example of the change of a signal detection threshold in a communication system according to the first embodiment.

FIG. 5 is an explanatory diagram for explaining an example of the change of a signal detection threshold in the communication system 1 according to the embodiment. FIG. 5 shows an example of the case in which a threshold change request from the terminal device 100A is permitted although the condition is not fulfilled. It is supposed that the terminal devices 100A and 100B belong to the base station 200, and the terminal device 100C is an interference terminal belonging to another wireless network. As shown in FIG. 5, the interference terminal 100C has a smaller distance to the base station 200 than the terminal device 100B. Thus, the belonging terminal device 100B has smaller signal intensity at the wireless communication unit 210 than the interference terminal 100C, which does not fulfill the condition. When the terminal device 100A increases the signal detection threshold so that the interference terminal 100C is outside the signal detection range 30A while the condition is not fulfilled, it becomes difficult that the terminal device 100A detects even wireless transmission from the terminal device 100B by carrier sense, thus increasing the possibility of interference. Here, the terminal device 100A has a smaller distance to the base station 200 than the terminal device 100B. Thus, the terminal device 100A has higher reception signal intensity at the base station 200 than the terminal device 100B. Therefore, when the signal detection threshold is changed without fulfilling the condition, the possibility of interference increases and, further, it becomes difficult that the base station 200 obtains wireless signals from the terminal device 100B having lower reception signal intensity. With this condition, the base station 200 can reject the change of a signal detection threshold in such a situation.

For example, one of the conditions set by the control unit 230 is that the importance of data subjected to transmission suppression is higher than that of data transmitted from any of the terminal devices 100 belonging to the own wireless network. The control unit 230 determines that the condition is fulfilled when the importance of data subjected to transmission suppression is higher than that of data transmitted from any of the belonging terminals 100. Meanwhile, the control unit 230 determines that the condition is not fulfilled when data higher in importance than data subjected to transmission suppression is transmitted from the belonging terminal device 100. The control unit 230 may determine the condition based on data being transmitted to and received from the belonging terminal device 100 or data transmitted to and received from the terminal device 100 most recently, or determine the condition receiving, as needed, a report of the importance of data from the belonging terminal device 100. With this condition, the base station 200 can set the priority to transmission of data of higher importance by allowing the terminal device 100 that is a transmission origin of a threshold change request to obtain the transmission opportunity regarding important data.

The control unit 230 permits the change of a signal detection threshold when all of these conditions are fulfilled. The control unit 230 generates a threshold change response for changing a signal detection threshold. The threshold change response includes information indicating un upper limit value of the signal detection threshold. Note that the upper limit value of the signal detection threshold may be calculated by the control unit 230 or may be a preliminarily set value. Meanwhile, when these conditions are not fulfilled, the control unit 230 generates a threshold change response for rejecting the change of a signal detection threshold.

Here, only with the change of the signal detection threshold of the terminal device 100, it is still possible that the base station 200 fails in receiving desired signals. This point will be described in detail with reference to FIG. 6.

Figure 6:
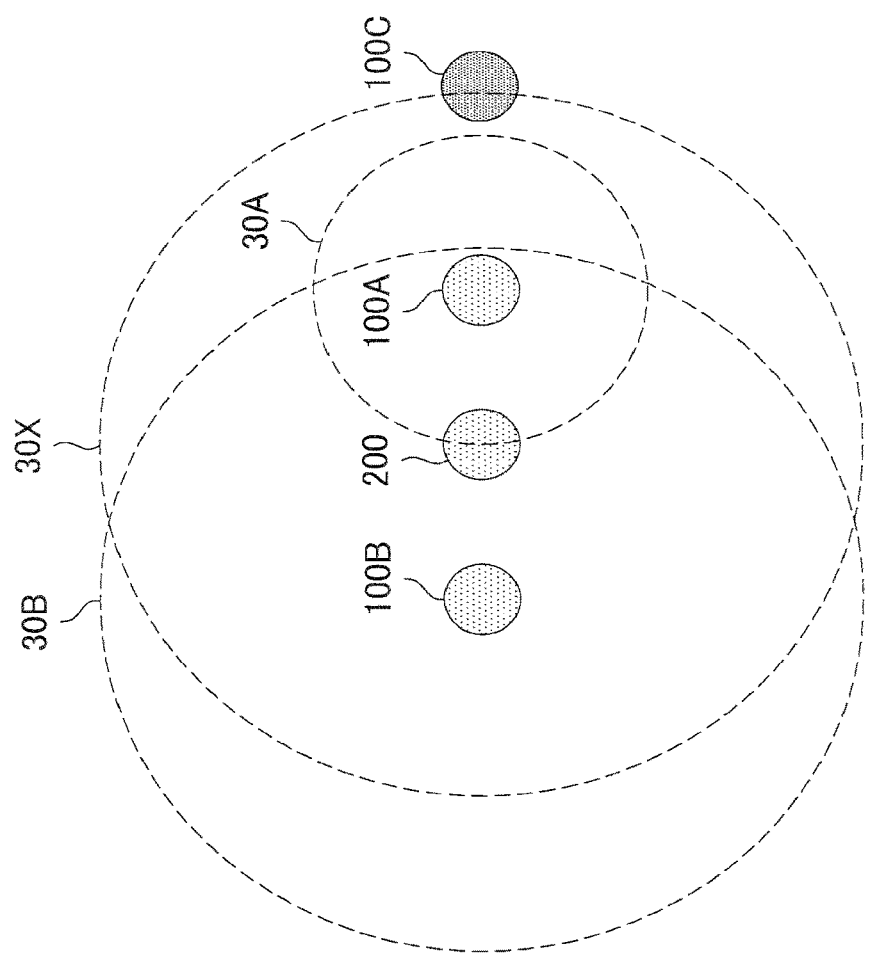
FIG. 6 is an explanatory diagram for explaining an example of the change of a signal detection threshold in a communication system according to the first embodiment.

FIG. 6 is an explanatory diagram for explaining an example of the change of a signal detection threshold in the communication system 1 according to the first embodiment. FIG. 6 shows an example of the case in which a threshold change request from the terminal device 100A is permitted. In FIG. 6, the terminal device 100C is positioned in the signal detection range 30 of the base station 200. Thus, the base station 200 can detect wireless signals from the terminal device 100A and the terminal device 100C. When the base station 200 detects signals, it performs reception processing (including demodulation processing, error correction processing, and the like) of the signals from one of them, based on their reception signal intensity. Thus, the base station 200 may perform reception processing of wireless signals from the terminal device 100C. In such a case, it becomes difficult to perform reception processing of wireless signals from the terminal device 100A. That is, only with the change of the signal detection threshold of the terminal device 100A, it is still possible to fail in receiving wireless signals from the terminal device 100A fails.

Thus, when the control unit 230 changes a signal detection threshold of the terminal device 100 belonging to the own wireless network, it may change a signal detection threshold of the wireless communication unit 210. This function will be described in detail with reference to FIG. 7.

Figure 7:
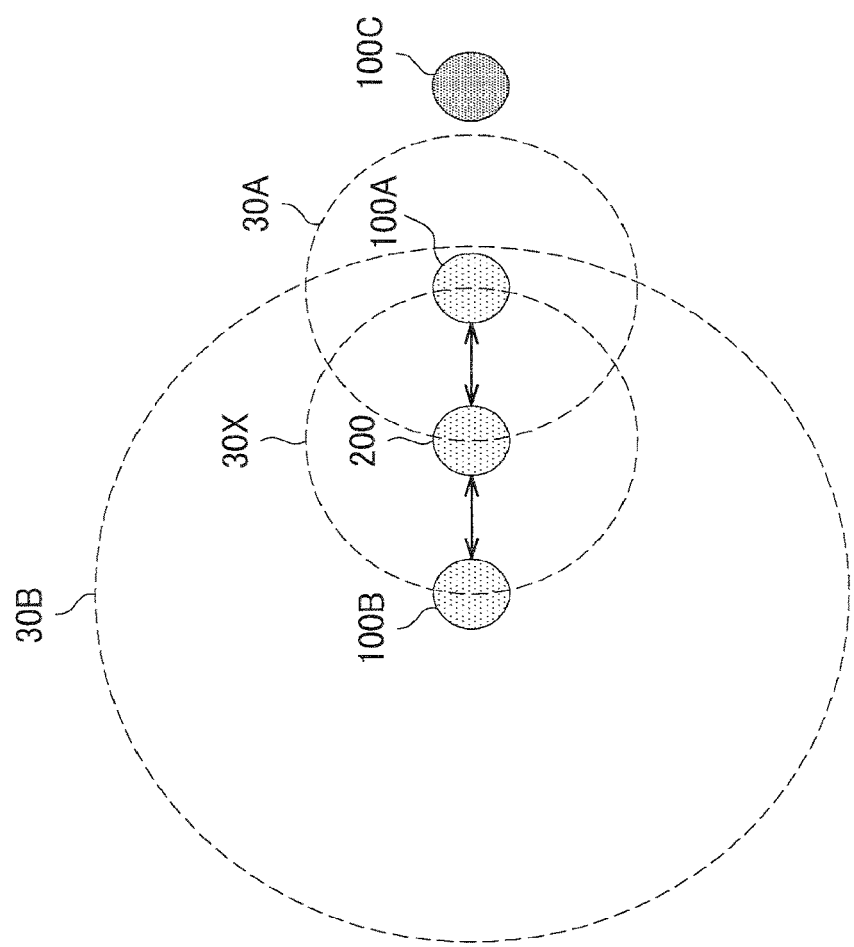
FIG. 7 is an explanatory diagram for explaining an example of the change of a signal detection threshold in a communication system according to the first embodiment.

FIG. 7 is an explanatory diagram for explaining an example of the change of a signal detection threshold in the communication system 1 according to the first embodiment. FIG. 7 shows an example of the case in which a threshold change request from the terminal device 100A is permitted. As shown in FIG. 7, the base station 200 increases a signal detection threshold so that the signal detection range 30X is smaller than FIG. 6. Thus, the terminal device 100C that is an interference terminal is outside the signal detection range 30X, which allows the base station 200 to perform reception processing of wireless signals from the terminal device 100A without performing reception processing of wireless signals from the terminal device 100C.

Moreover, the control unit 230 controls the wireless communication unit 210 to transmit a threshold change notification indicating that the terminal device 100 changes the signal detection threshold to the terminal devices 100 belonging to the own wireless network. For example, when the change of the threshold has been permitted, the control unit 230 transmits a threshold change notification to all of the belonging terminal devices 100. Thus, the terminal device 100 can recognize that another terminal device 100 belonging to the own wireless network changes the signal detection threshold. The threshold change notification may include identification information of the terminal device 100 for which the signal detection threshold is changed. Thus, the terminal device 100 can specify another terminal device 100 changing the signal detection threshold. Moreover, the terminal device 100 can determine whether another terminal device 100 having changed the signal detection threshold belongs to the own wireless network. In this case, only when an interference terminal has changed the signal detection threshold and it belongs to the wireless network to which the terminal device 100 belongs, the terminal device 100 transmits a threshold change cancellation request described later so as to avoid transmission and reception of unnecessary messages.

When the terminal device 100 having an increased signal detection threshold exists, it has more transmission opportunities than other terminal devices 100, which may, conversely, reduce transmission opportunities of other terminal devices 100 and cause interference. Then, the communication system 1 cancels the change of a threshold and undoes the signal detection threshold changed once. The terminal device 100 can recognize, by a threshold change notification, that another terminal device 100 changes the signal detection threshold, and thus the terminal device 100 can also request the cancellation of the change of a threshold. The concrete contents of cancellation of the change of a threshold will be described in detail in the following second embodiment, and thus the explanation is omitted here. Note that the threshold change notification may be included in a beacon frame transmitted by the base station 200 or may be included in broadcast signals.

The configuration example of the base station 200 according to the embodiment has been described above. Next, the operation processing example of the communication system 1 according to the embodiment will be described with reference to FIG. 8 to FIG. 10.

[2-3. Example of Operation Processing]

Figure 8:
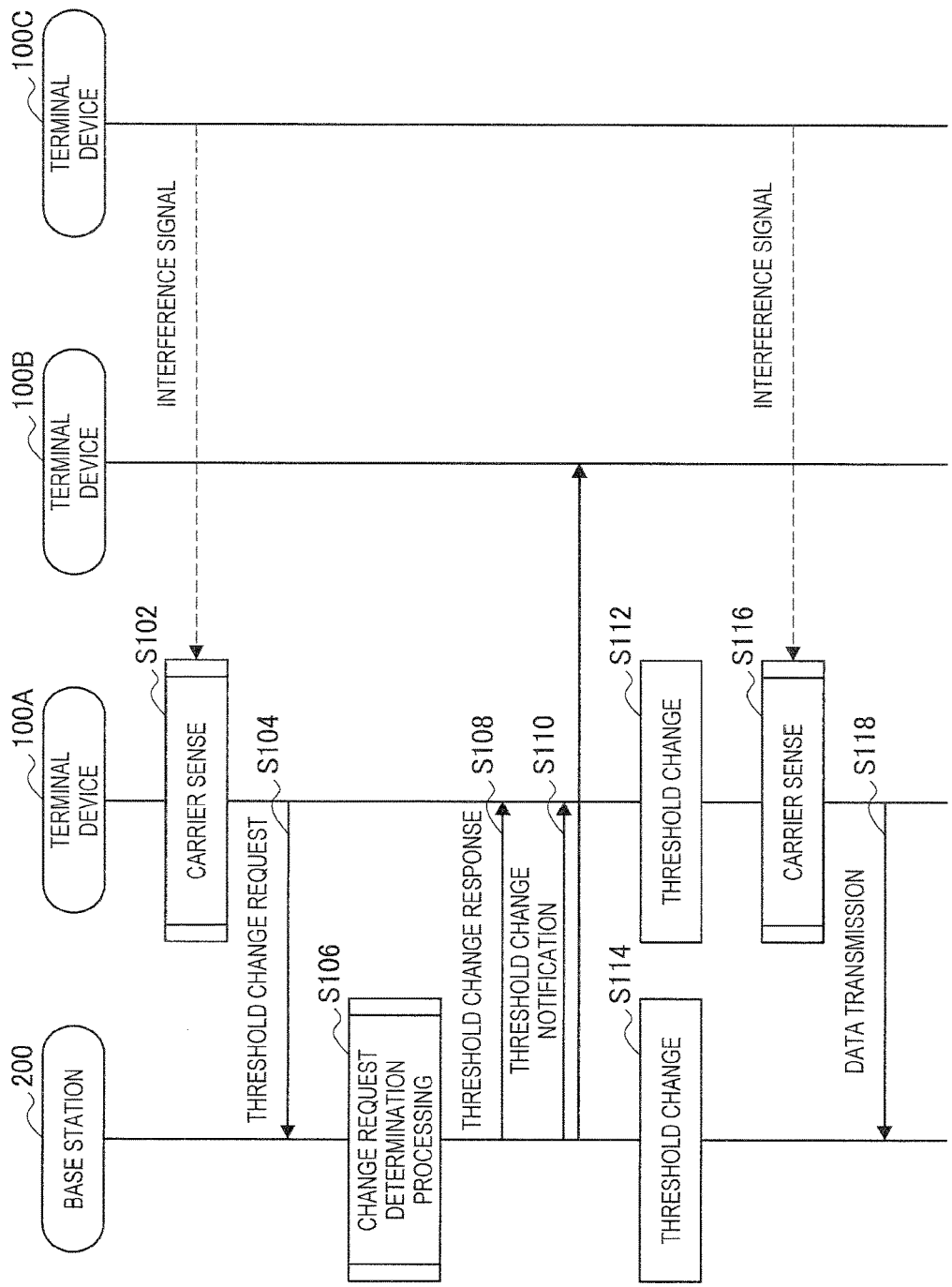
FIG. 8 is a sequence diagram showing an example of a flow of signal detection threshold change processing performed in the communication system according to the first embodiment.

FIG. 8 is a sequence diagram showing an example of a flow of signal detection threshold change processing performed in the communication system 1 according to the embodiment. The sequence shown in FIG. 8 is related to the terminal devices 100A, 100B, and 100C and the base station 200. Note that the positional relation of these devices is as shown in FIG. 1.

As shown in FIG. 8, at Step S102, the terminal device 100A first performs carrier sense before transmitting data. Here, it is supposed that the terminal device 100A has received interference signals from the terminal device 100C. The processing by the terminal device 100A in this case will be described in detail with reference to FIG. 9.

Figure 9:
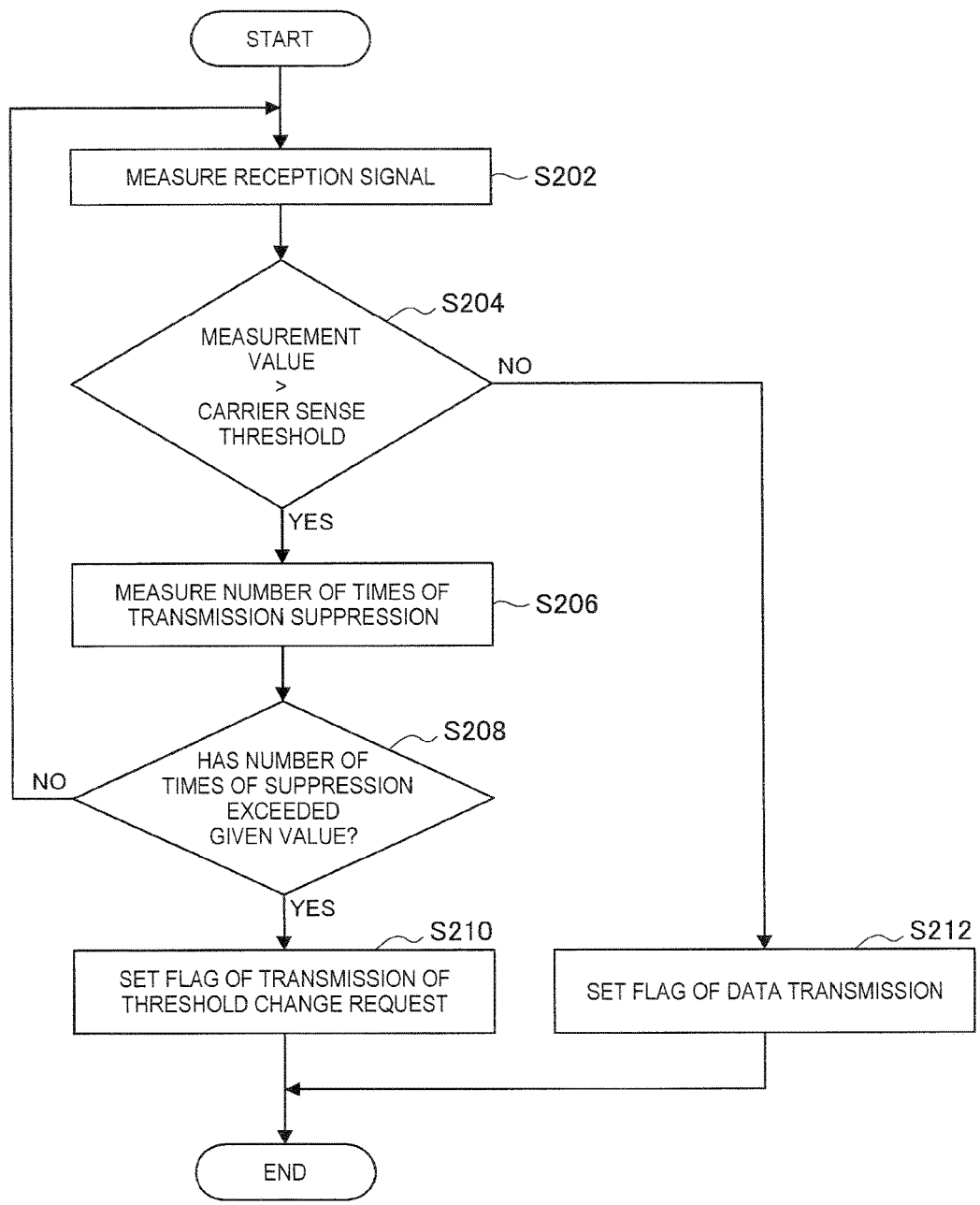
FIG. 9 is a flowchart showing an example of a flow of carrier sense processing performed in the terminal device according to the first embodiment.

FIG. 9 is a flowchart showing an example of a flow of carrier sense processing performed in the terminal device 100 according to the embodiment. As shown in FIG. 9, at Step S202, the carrier sense unit 120 first measures reception signals. Then, at Step S204, the carrier sense unit 120 determines whether a measurement value of the reception signals exceeds a signal detection threshold. When it is determined that the measurement value does not exceed the signal detection threshold (No at S204), the network is in an idle state, and thus the control unit 140 sets, at Step S212, a flag of data transmission and finishes carrier sense. Meanwhile, when it is determined that the measurement value exceeds the signal detection threshold (Yes at S204), the network is in a busy state, and thus the control unit 140 suppresses wireless transmission and counts the number of times of suppression at Step S206. Here, the control unit 140 associates the measurement value and the identification information of the interference terminal, and stores them in the storage unit 130. Next, at Step S208, the control unit 140 determines whether the number of times of suppression has exceeded a given value. When the number of times of suppression has not exceeded a given value (No at S208), the processing returns to Step S202 again. Meanwhile, when the number of times of suppression has exceeded a given value (Yes at S208), the control unit 140 sets, at Step S210, a flag of transmission of a threshold change request, and finishes carrier sense.

The processing at Step S102 of FIG. 8 has been described above. In the following, the description returns to FIG. 8. When the flag of transmission of a threshold change request is set, the processing shifts to Step S104. When the flag of data transmission is set, the processing shifts to Step S118. The following will describe the case in which the flag of transmission of a threshold change request is set.

Subsequently, at Step S104, the terminal device 100A transmits a threshold change request to the base station 200. The terminal device 100A performs carrier sense various times at Step S102, and transmits, when the flag of transmission of a threshold change request is set, the threshold change request before transmitting data. For example, the threshold change request may include the identification information of an interference terminal, the measurement result of interference signals (reception signal intensity or SN ratio), and the information indicating the importance of data subjected to transmission suppression.

Next, at Step S106, the base station 200 performs change request determination processing. The processing by the base station 200 here will be described in detail with reference to FIG. 10.

Figure 10:
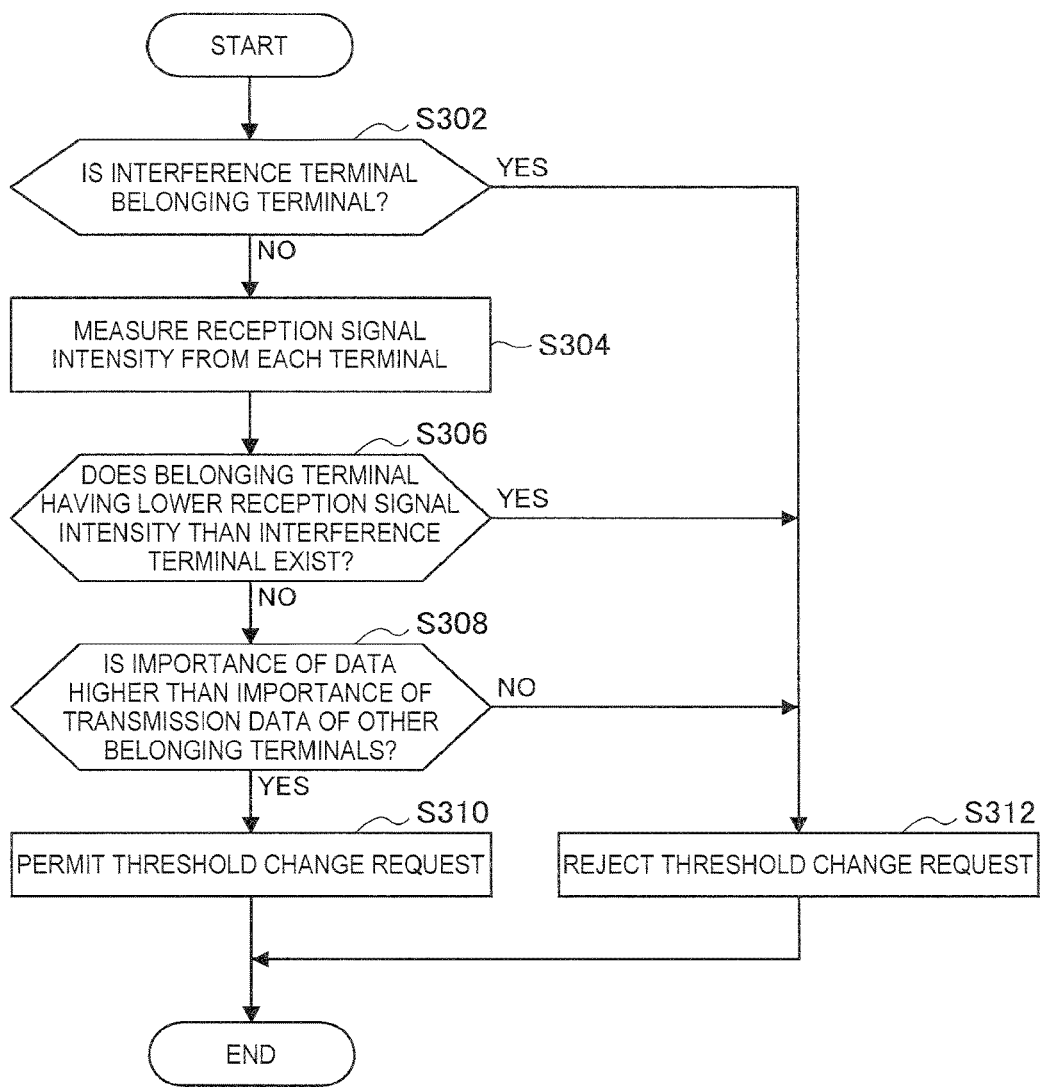
FIG. 10 is a flowchart showing an example of a flow of change request determination processing performed in the base station according to the first embodiment.

FIG. 10 is a flowchart showing an example of a flow of change request determination processing performed in the base station 200 according to the embodiment. As shown in FIG. 10, at Step S302, the control unit 230 first determines whether the interference terminal is a belonging terminal. When the interference terminal is a belonging terminal (Yes at S302), the control unit 230 rejects the threshold change request at Step S312. Meanwhile, when the interference terminal is not a belonging terminal (No at S302), the control unit 230 measures, at Step S304, reception signal intensity from each terminal at the wireless communication unit 210. Next, at Step S306, the control unit 230 determines whether the belonging terminal device 100 having lower reception signal intensity than the interference terminal exists. When it is determined that the belonging terminal device 100 having lower reception signal intensity than the interference terminal exists (Yes at S306), the control unit 230 rejects the threshold change request at Step S312. Meanwhile, when it is determined that the belonging terminal device 100 does not exist (No at S306), the control unit 230 determines, at Step S308, whether the importance of data subjected to transmission suppression is higher than that of transmission data of other belonging terminal devices 100. When it is determined that the importance of data subjected to transmission suppression is higher (Yes at S308), the control unit 230 permits the threshold change request at Step S310. Meanwhile, when it is determined that the importance of the data is lower (No at S308), the control unit 230 rejects the threshold change request at Step S312.

The processing at Step S106 of FIG. 8 has been described above. In the following, the description returns to FIG. 8. Note that the following describes an example of the case in which the change of a threshold has been permitted at Step S106.

Subsequently, at Step S108, the base station 200 transmits a threshold change response as a reply to the terminal device 100A. The threshold change response includes information indicating that the threshold change request is permitted and information indicating un upper limit value of the signal detection threshold. Note that when the change of a threshold is not permitted, the base station 200 transmits a threshold change response indicating that the threshold change request is rejected to the terminal device 100A, for example.

Next, at Step S110, the base station 200 transmits as a reply a threshold change notification to the belonging terminal devices 100. Both the terminal devices 100A and 100B having received the threshold change notification store a threshold changed state as a current state.

Then, at Step S112, the terminal device 100A changes the signal detection threshold based on the threshold change response. To be more specific, the control unit 140 increases the signal detection threshold, in a range of an upper limit value of the signal detection threshold included in the threshold change response, so that the interference terminal is outside the signal detection range.

Moreover, at Step S114, the base station 200 changes the own signal detection threshold. To be more specific, the control unit 230 increases the signal detection threshold so that the interference terminal is outside the signal detection range.

Then, at Step S116, the terminal device 100A performs carrier sense again. The processing here is as described above with reference to FIG. 9. When the terminal device 100A has increased the signal detection threshold so that the terminal device 100C is outside the signal detection range at Step S112, it fails in detecting interference signals from the terminal device 100C. Thus, the terminal device 100A sets a flag of data transmission and finishes carrier sense.

In this manner, the terminal device 100A performs data transmission at Step S118.

<3. SECOND EMBODIMENT>

The present embodiment is a form in which the change of a threshold is cancelled to undo the signal detection threshold changed once.

[3-1. Configuration Example of Terminal Device]

A configuration example of the terminal device 100 according to the embodiment is same as the first embodiment. Here, the characteristic configuration of the terminal device 100 of the embodiment will be described.

(Wireless Communication Unit 110)

The wireless communication unit 110 of the embodiment transmits a threshold change cancellation request to the base station 200. The wireless communication unit 110 receives a threshold change cancellation notification from the base station 200. The threshold change cancellation request is a message for cancelling the change of a signal detection threshold. The threshold change cancellation request includes identification information of the terminal device 100 for which the change of a threshold is cancelled. The threshold change cancellation notification is a message for notifying of cancellation of the change of a signal detection threshold.

(Control Unit 140)

The control unit 140 has a function of cancelling the change of the own signal detection threshold. For example, the control unit 140 cancels the change of the own signal detection threshold based on the order from the base station 200. For example, when the wireless communication unit 110 has received a threshold change cancellation notification in the state where the signal detection threshold of the control unit 140 is changed, the control unit 140 cancels the change of the signal detection threshold and restores an original default value. Moreover, the control unit 140 may determine spontaneously whether the change of the signal detection threshold should be cancelled. For example, when the control unit 140 has changed the own signal detection threshold and data transmission as a trigger for a threshold change request has been completed, the control unit 140 controls the wireless communication unit 110 to transmit a threshold change cancellation request to the base station 200. Then, when the base station 200 transmits as a reply a threshold change cancellation notification, the control unit 140 cancels the change of the signal detection threshold and restores an original default value. In this manner, it is possible to prevent the case in which the signal detection threshold remains high and transmission opportunities of other terminal devices 100 are suppressed excessively. Moreover, when a threshold change cancellation request is transmitted to the base station 200 under the above-described condition in the state where the signal detection threshold of the control unit 140 is changed, the control unit 140 may restore an original default value of the own threshold before receiving a threshold change cancellation notification. That is, the control unit 140 may cancel the change of the signal detection threshold when the data transmission as a trigger for a threshold change request has been completed. Note that the threshold change cancellation request includes, as identification information of the terminal device 100 for which the change of a threshold is cancelled, the own identification information.

Moreover, the control unit 140 according to the embodiment has a function of cancelling the change of a signal detection threshold of another terminal device 100 belonging to the own wireless network. For example, the control unit 140 determines whether to request the cancellation of a threshold change and controls, when requesting it, the wireless communication unit 110 to transmit a threshold change cancellation request to the base station 200. As described later, the base station 200 having received the threshold change cancellation request determines whether to permit the cancellation of a threshold change and transmits, when permitting it, a threshold change cancellation notification to the belonging terminal device 100. When the terminal device 100 with a changed signal detection threshold has received the threshold change cancellation notification, it cancels the change of the signal detection threshold and restores an original default value. In this manner, the terminal device 100 can prevent excessive increase of transmission opportunities of another terminal device 100 with an increased signal detection threshold, and secure the own transmission opportunities.

When the control unit 140 recognizes that the signal detection threshold of another terminal device 100 belonging to the own wireless network has been changed, based on the threshold change notification received from the base station 200, it requests cancellation of the change of a threshold with various factors as a trigger. For example, the control unit 140 controls the wireless communication unit 110 to transmit a threshold change cancellation request to the base station 200 with a trigger that the number of times of suppression of data transmission by carrier sense has exceeded a given value. Alternatively, the control unit 140 controls the wireless communication unit 110 to transmit a threshold change cancellation request to the base station 200 with a trigger that a failure rate of data transmission has exceeded a given value. In these cases, the threshold change cancellation request includes, as identification information of the terminal device 100 for which the change of a threshold is cancelled, identification information of an interference terminal detected by carrier sense. With these triggers, the terminal device 100 can restore the own transmission opportunities after yielding transmission opportunities to another terminal device 100 having changed the signal detection threshold.

The characteristic configuration example of the terminal device 100 according to the embodiment has been described above. The following will describe the characteristic configuration example of the base station 200 according to the embodiment.

[3-2. Configuration Example of Base Station]

A configuration example of the base station 200 according to the embodiment is same as the first embodiment. Here, the characteristic configuration of the base station 200 of the embodiment will be described.

(Wireless Communication Unit 210)

The wireless communication unit 210 of the embodiment receives a threshold change cancellation request from the terminal device 100. Moreover, the wireless communication unit 210 transmits a threshold change cancellation notification to the belonging terminal device 100.

(Control Unit 230)

The control unit 230 of the embodiment determines whether the cancellation of the change of a threshold is necessary, based on the threshold change cancellation request received from the terminal device 100, and transmits a threshold change cancellation notification. For example, the control unit 230 permits the cancellation of the change of a threshold when the identification information of an interference terminal included in the threshold change cancellation request indicates a belonging terminal and is of a terminal for which the change of a threshold has been permitted, while it rejects the cancellation of the change of a threshold in other cases. Note that the threshold change notification and the threshold change cancellation notification may have the same frame configuration with an only difference in on or off of a flag indicating whether the threshold value is changed.

Moreover, the control unit 230 of the embodiment may determine spontaneously whether the cancellation of the change of a threshold change is necessary without waiting a threshold change cancellation request from the terminal device 100. For example, the control unit 230 may determine whether the cancellation of the change of a threshold is necessary based on a reception success rate, at the wireless communication unit 210, of wireless signals transmitted from the belonging terminal device 100. For example, the control unit 230 determines that the change of the threshold is to be cancelled when the reception success rate, the reception success rate per unit time, or the like is lower than a given value, while it determines that the change of the threshold is not to be cancelled when it exceeds a given value. Then, when it is determined that the change of the threshold is to be cancelled, the control unit 230 controls the wireless communication unit 210 to transmit a threshold change cancellation notification to the belonging terminal device 100. In this manner, the communication system 1 can cancel the change of the threshold based on not only the determination of the terminal device 100 but also the determination of the base station 200.

Note that the control unit 230 may include, in a threshold change cancellation notification, identification information of the terminal device 100 for which the threshold change is to be cancelled. Then, the terminal device 100 may cancel the change of the own signal detection threshold only when the own identification information is included in the threshold change cancellation notification. In this case, the base station 200 can specify some belonging terminal devices 100 with a changed signal detection threshold to cancel the change of the signal detection threshold. Moreover, the control unit 230 may include, in a threshold change cancellation notification, information for ordering the cancellation of the change regarding all of the belonging terminal devices 100. In this case, the base station 200 can control all of the belonging terminal devices 100 with a changed signal detection threshold to cancel the change of the signal detection threshold.

The characteristic configuration example of the base station 200 according to the embodiment has been described above. Next, an operation processing example of the communication system 1 according to the embodiment will be described with reference to FIG. 11.

[3-3. Example of Operation Processing]

Figure 11:
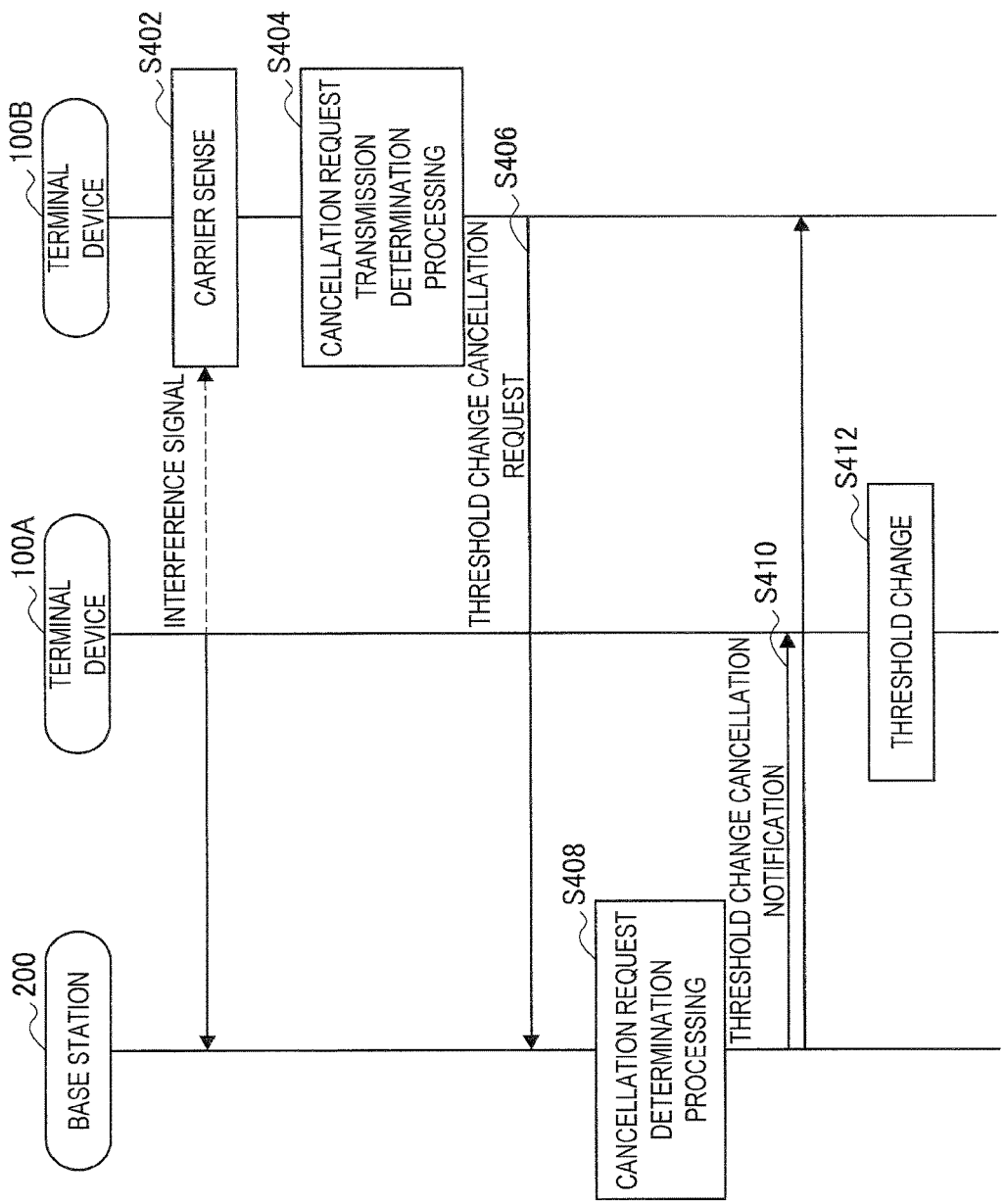
FIG. 11 is a sequence diagram showing an example of a flow of threshold change cancellation processing performed in a communication system according to a second embodiment.

FIG. 11 is a sequence diagram showing an example of a flow of threshold change cancellation processing performed in the communication system 1 according to the embodiment. The sequence shown in FIG. 11 is related to the terminal devices 100A and 100B, and the base station 200. Note that the positional relation of these devices is as shown in FIG. 1. It is supposed that the signal detection threshold of the terminal device 100A is increased by the signal detection threshold change processing described above with reference to FIG. 8.

At Step S402, the terminal device 100B first performs carrier sense before transmitting data. Here, wireless signals transmitted to the base station 200 by the terminal device 100A are detected by the terminal device 100B.

Next, at Step S404, the terminal device 100B performs cancellation request transmission determination processing. For example, it is assumed that the signal detection threshold of another terminal device 100 belonging to the own wireless network has been changed. In this case, the control unit 140 determines that a cancellation request is to be transmitted when the number of times of suppression of data transmission by carrier sense has exceeded a given value, or when a failure rate of data transmission has exceeded a given value, while the control unit 140 determines that a cancellation request is not to be transmitted when they have not exceeded a given value. For example, it is assumed that the signal detection threshold of the terminal device 100 itself has been changed. In this case, the control unit 140 determines that a cancellation request it to be transmitted when the data transmission as a trigger for a threshold change request has been completed, while it determines that a cancellation request is not to be transmitted when the data transmission has not been completed. The following will describe an example in which the control unit 140 of the terminal device 100B has determined that a cancellation request is to be transmitted regarding the terminal device 100A that is a transmission origin of interference signals.

Subsequently, at Step S406, the terminal device 100B transmits a threshold change cancellation request to the base station 200. For example, the threshold change cancellation request includes identification information of the terminal device 100A that is a transmission origin of interference signals, as an object of cancellation of the change of the threshold.

Next, at Step S408, the base station 200 performs cancellation request determination processing. To be more specific, the control unit 230 determines whether the identification information of the interference terminal included in the threshold change cancellation request indicates a belonging terminal and is of a terminal for which the change of the threshold has been permitted. The control unit 230 permits the cancellation of the change of the threshold when these are fulfilled, while it rejects the cancellation when at least one of them is not fulfilled.

Next, at Step S410, the base station 200 transmits a threshold change cancellation notification to the belonging terminal devices 100. Both the terminal devices 100A and 100B having received the threshold change cancellation notification store the update of a current state from a threshold changed state to a normal state.

Then, at Step S412, the terminal device 100 having received the threshold change cancellation notification changes the signal detection threshold based on the threshold change cancellation notification. In this example, the signal detection threshold of the terminal device 100A is changed. Thus, only the terminal device 100A restores an original default value of the signal detection threshold. Meanwhile, the signal detection threshold of the terminal device 100B is not changed and is still default. Thus, it is kept as it is without any change. Note that the base station 200 restores an original default value when the signal detection threshold is changed.

<4. Application examples>

The technology according to the present disclosure can be applied to various products. For example, the terminal device 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the terminal device 100 may be realized as terminals (also referred to as machine type communication (MTC) terminals) which perform machine to machine (M2M) communication, such as smart meters, vending machine, remote monitoring apparatuses and point of sale (POS) terminals. Furthermore, the terminal device 100 may be wireless communication modules mounted in such terminals (for example, integrated circuit modules configured in one die).

For example, the base station 200 may be realized as a wireless LAN access point (which is also referred to as a wireless base station) that has no router function or has a router function. The base station 200 may be realized as a mobile wireless LAN router. Furthermore, the base station 200 may be wireless communication modules mounted in such devices (for example, integrated circuit modules configured in one die).

[4-1. First Application Example]

Figure 12:
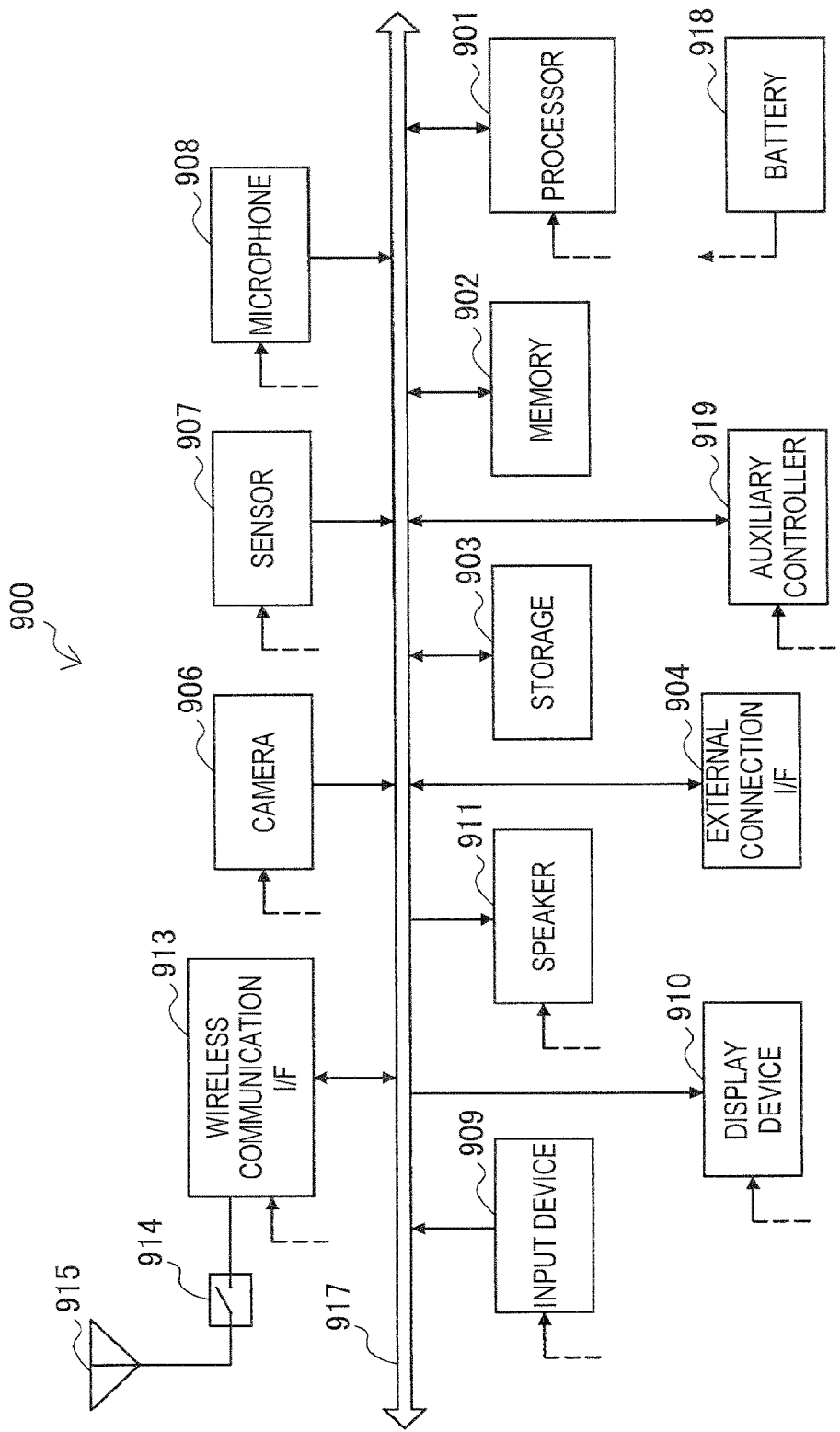
FIG. 12 is a block diagram showing an example of a schematic configuration of a smartphone.

FIG. 12 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct (registered trademark) is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 12. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 12 via power supply lines partially indicated by dashed lines in the drawing. The auxiliary controller 919 causes, for example, required minimum functions of the smartphone 900 to be operated in a sleep mode.

In the smartphone 900 shown in FIG. 12, the wireless communication unit 110, the carrier sensing unit 120, the storage unit 130, and the control unit 140 shown in FIG. 2 may be mounted on the wireless communication interface 913. At least some of the functions may be mounted on the processor 901 or the auxiliary controller 919.

The smartphone 900 may operate as a wireless access point (software AP) when the processor 901 performs an access point function at an application level. The wireless communication interface 913 may have the wireless access point function.

[4-2. Second application example]

Figure 13:
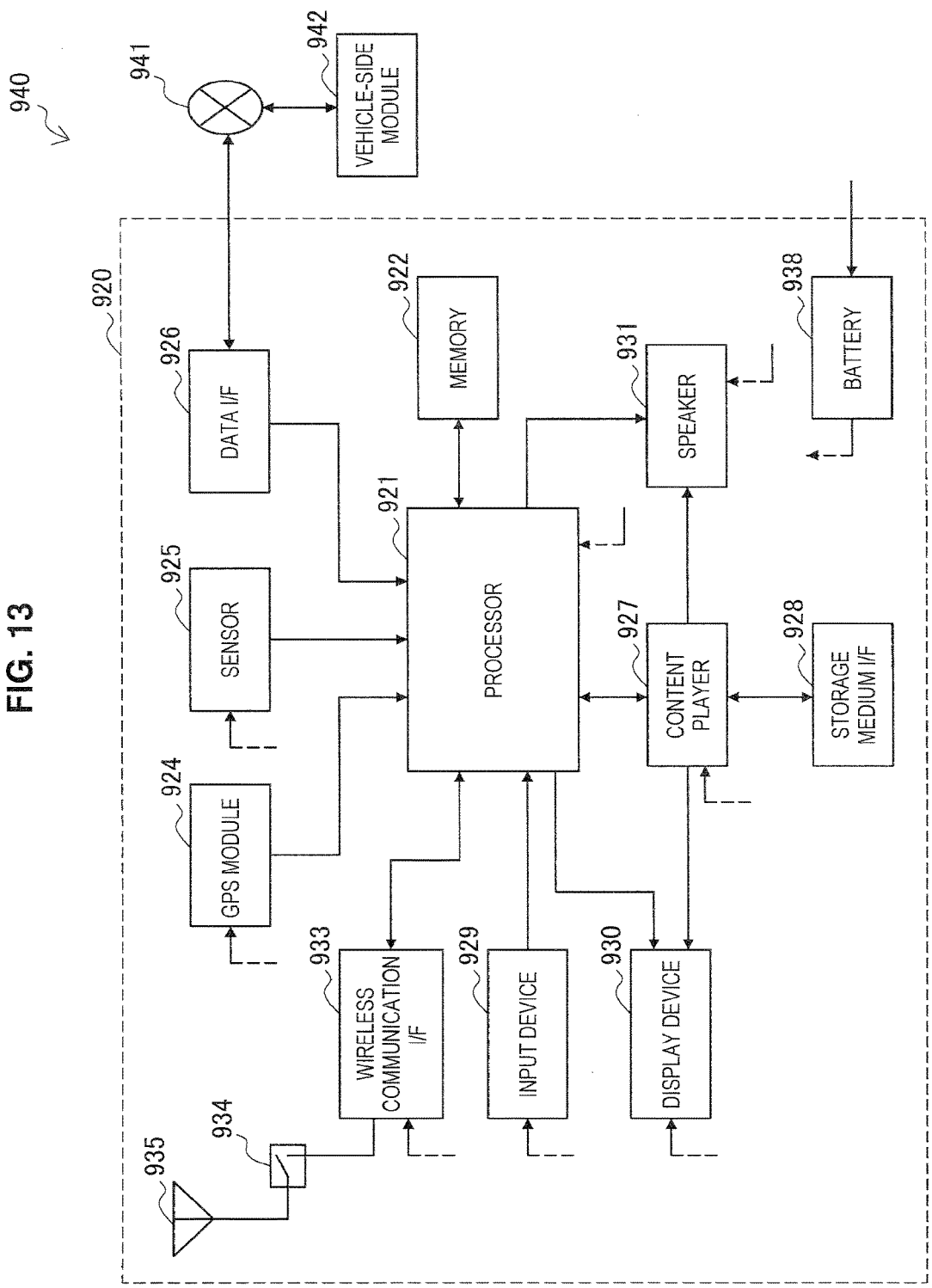
FIG. 13 is a block diagram showing an example of a schematic configuration of a car navigation device.

FIG. 13 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 13. In this case, the antenna switch 934 may be omitted from the configuration of the car navigation apparatus 920.

The battery 938 supplies electric power to each of the blocks of the car navigation apparatus 920 shown in FIG. 14 via power supply lines partially indicated by dashed lines in the drawing. In addition, the battery 938 accumulates electric power supplied from the vehicle.

In the car navigation apparatus 920 shown in FIG. 13, the wireless communication unit 110, the carrier sensing unit 120, the storage unit 130, and the control unit 140 shown in FIG. 2 may be mounted on the wireless communication interface 933. At least some of the functions may be mounted on the processor 901.

Moreover, the wireless communication interface 933 may operate as the above-described base station 200 and provide wireless connection to a terminal of a user on a vehicle.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

[4-3. Third application example]

FIG. 14 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and operates various functions (for example, access restriction, routing, encryption, firewalls, and log management, and the like) of an internet protocol (IP) layer and higher layers of the wireless access point 950. The memory 952 includes a RAM and a ROM, and stores programs executed by the controller 951 and various kinds of data (for example, a terminal list, a routing table, a cryptographic key, security setting, a log, and the like).

The input device 954 includes, for example, buttons, switches, and the like to receive operation from a user. The display device 955 includes an LED lamp or the like to display an operation status of the wireless access point 950.

The network interface 957 is a wired communication interface for connecting the wireless access point 950 to a wireless communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards of IEEE 802.11a, 11b, 11g, 11n, 11ac, and 11ad to provide wireless communication as an access point to adjacent terminals. The wireless communication interface 963 can typically include a baseband processor, an RF circuit, a power amplifier, and the like. The wireless communication interface 963 may be a single-chip module on which a memory that stores a communication control program, a processor that executes the program, and a relevant circuit are integrated. The antenna switch 964 switches a connection destination of the antenna 965 for a plurality of circuits included in the wireless communication interface 913. The antenna 965 has a single or a plurality of antenna elements, and is used for transmission and reception of wireless signals from the wireless communication interface 963.

In the wireless access point 950 shown in FIG. 14, the wireless communication unit 210, the storage unit 220, and the control unit 230 shown in FIG. 4 may be mounted on the wireless communication interface 963. At least some of the functions may be mounted on the controller 951.

<5. Conclusion>

In the above, one embodiment of the present disclosure has been described in detail with reference to FIG. 1 to FIG. 14. In the embodiment described above, the terminal device 100 that performs communication with the base station 200 forming a wireless network, performs carrier sense with another device and controls, based on a carrier sense result, a signal detection threshold so that another terminal device belonging to another wireless network is outside a signal detection range. In this manner, the terminal device 100 can prevent excessive transmission suppression by carrier sense in the situation where transmission suppression is unnecessary. To be more specific, the terminal device 100 can prevent excessive transmission suppression due to a terminal device belonging to another network. In this manner, it is possible to improve the throughput of the whole communication system 1.

The terminal device 100 transmits a threshold change request to the base station 200 and changes a signal detection threshold based on a threshold change response transmitted as a replay from the base station 200. In this manner, the base station 200 can control the change/cancellation/retention of a signal detection threshold of the belonging terminal devices 100 in a unified manner.

The terminal device 100 transmits a threshold change cancellation request for cancelling the change of a signal detection threshold to the base station 200. The terminal device 100 can avoid excessive concentration of transmission opportunities on some terminal devices 100 by canceling the change regarding an interference terminal or canceling the change regarding the terminal device 100 itself.

In the embodiment, the base station 200 forming a wireless network and performing communication with the terminal device 100 transmits as a reply a threshold change response so that a terminal device belonging to a different wireless network is outside a signal detection range of the belonging terminal device 100, based on a threshold change request received from the belonging terminal device 100. Thus, the base station 200 can prevent the belonging terminal device 100 from performing excessive transmission suppression by carrier sense in spite of the situation where transmission suppression is unnecessary. To be more specific, the base station 200 can prevent the belonging terminal device 100 from performing excessive transmission suppression due to a terminal device belonging to another network.

Moreover, the base station 200 changes the own signal detection threshold when the signal detection threshold of the belonging terminal device 100 is changed. In this manner, the base station 200 can make an interference terminal outside the signal detection range, preventing unnecessary reception processing.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above has described the example in which the communication system is a system conforming to a wireless LAN or a communication standard equivalent thereto. However, the present technology is not limited to such an example. For example, the communication system may be a system conforming to other communication standards.

Moreover, the above has described that the terminal device 100 changes a signal detection threshold for carrier sense regarding a wireless frame as a trigger for a threshold change request, and cancels the change after transmission is completed. However, the present technology is not limited to such an example. For example, the terminal device 100 may change a signal detection threshold for carrier sense regarding a series of data (video, files, and the like) including a wireless frame as a trigger for a threshold change request, and cancel the change after the transmission is completed.

Furthermore, the above has described that the base station 200 determines whether the change of a threshold is permitted or determines whether the cancellation of the change of a threshold is permitted. However, the present technology is not limited to such an example. For example, the terminal device 100 may perform a part of such determination processing. For example, the terminal device 100 may determine whether an interference terminal belongs to the own wireless network, and then transmit a threshold change request or a threshold change cancellation request to the base station 200. In this case, the processing load of the base station 200 is reduced.

The series of processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution by a computer, such programs are written into a random access memory (RAM) and executed by a processor such as a CPU.

Note that it is not necessary for the processes described in this specification with reference to the flowchart to be executed in the order shown in the flowchart. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A terminal device, including:

a wireless communication unit that performs communication with a base station that forms a first wireless network;

a carrier sense unit that performs carrier sense with another device; and a control unit that controls a signal detection threshold so that another terminal device belonging to a second wireless network different from the first wireless network is outside a signal detection range, based on a carrier sense result by the carrier sense unit.

(2)

The terminal device according to (1), wherein the control unit controls the wireless communication unit to transmit a threshold change request to the base station with a trigger that an index related to transmission suppression by the carrier sense has exceeded a given threshold.

(3)

The terminal device according to (2), wherein the threshold change request includes identification information of another terminal device that is a transmission origin of wireless signals detected by the carrier sense unit.

(4)

The terminal device according to (2) or (3), wherein the threshold change request includes information indicating a measurement result of reception signal intensity measured by the carrier sense unit.

(5)

The terminal device according to any one of (2) to (4), wherein the threshold change request includes information indicating an importance of data subjected to transmission suppression by the carrier sense.

(6)

The terminal device according to any one of (2) to (5), wherein the control unit changes the signal detection threshold based on a threshold change response, regarding data transmission as a trigger for the threshold change request.

(7)

The terminal device according to any one of (1) to (6), wherein the control unit controls, when having recognized that a signal detection threshold of another terminal device belonging to the first wireless network has been changed based on a threshold change notification received from the base station, the wireless communication unit to transmit a threshold change cancellation request to the base station with a trigger that the number of times of suppression of data transmission by the carrier sense has exceeded a given value or that a failure rate of data transmission has exceeded a given value.

(8)

The terminal device according to (2) or any one of (3) to (7) citing (2), wherein the control unit controls the wireless communication unit to transmit a threshold change cancellation request to the base station when data transmission as a trigger for the threshold change request has been completed.

(9)

The terminal device according to (2) or any one of (3) to (8) citing (2), wherein the control unit cancels a change of the signal detection threshold when data transmission as a trigger for the threshold change request has been completed, or cancels a change of the signal detection threshold based on a threshold change cancellation notification received from the base station.

(10)

The terminal device according to any one of (1) to (9), wherein the wireless communication unit transmits a threshold change request or a threshold change cancellation request to the base station.

(11)

The terminal device according to any one of (1) to (10), wherein the wireless communication unit receives a threshold change response, a threshold change notification, or a threshold change cancellation notification from the base station.

(12)

A base station, including:

a wireless communication unit that forms a first wireless network and performs communication with a terminal device; and a control unit that transmits as a reply, through the wireless communication unit, a threshold change response for changing a signal detection threshold so that a second terminal device belonging to a second wireless network different from the first wireless network is outside a signal detection range of a first terminal device, based on a threshold change request received from the first terminal device belonging to the first wireless network.

(13)

The base station according to (12), wherein the control unit generates the threshold change response when all of the terminal devices belonging to the first wireless network have higher reception signal intensity at the wireless communication unit than the second terminal device.

(14)

The base station according to (12) or (13), wherein the control unit generates the threshold change response when an importance of data subjected to transmission suppression is higher than an importance of data transmitted from any of the terminal devices belonging to the first wireless network.

(15)

The base station according to any one of (12) to (14), wherein the control unit changes a signal detection threshold of the wireless communication unit when a signal detection threshold of the first terminal device is changed.

(16)

The base station according to any one of (12) to (15), wherein the control unit controls the wireless communication unit to transmit a threshold change notification indicating that the first terminal device changes the signal detection threshold to the terminal device belonging to the first wireless network.

(17)

The base station according to (16), wherein the threshold change notification includes identification information of the first terminal device for which the signal detection threshold is changed.

(18)

The base station according to any one of (12) to (17), wherein the control unit controls the wireless communication unit to transmit a threshold change cancellation notification to the terminal device belonging to the first wireless network, based on a reception success rate, at the wireless communication unit, of wireless signals transmitted from the terminal device belonging to the first wireless network.

(19)

A program that causes a computer to function as:

a wireless communication unit that performs communication with a base station that forms a first wireless network;

a carrier sense unit that performs carrier sense with another device; and a control unit that controls a signal detection threshold so that another terminal device belonging to a second wireless network different from the first wireless network is outside a signal detection range, based on a carrier sense result by the carrier sense unit.

(20)

A program that causes a computer to function as:

a wireless communication unit that forms a first wireless network and performs communication with a terminal device; and a control unit that transmits as a reply, through the wireless communication unit, a threshold change response for changing a signal detection threshold so that a second terminal device belonging to a second wireless network different from the first wireless network is outside a signal detection range of a first terminal device, based on a threshold change request received from the first terminal device belonging to the first wireless network.

(21)

A method, including:

in a terminal device that performs communication with a base station that forms a first wireless network, performing carrier sense with another device; and controlling a signal detection threshold so that another terminal device belonging to a second wireless network different from the first wireless network is outside a signal detection range, based on a carrier sense result.

(22)

A method, including:

in a base station that forms a first wireless network and performs communication with a terminal device, transmitting as a reply a threshold change response for changing a signal detection threshold so that a second terminal device belonging to a second wireless network different from the first wireless network is outside a signal detection range of a first terminal device, based on a threshold change request received from the first terminal device belonging to the first wireless network.

REFERENCE SIGNS LIST 1 communication system 1
100 terminal device 100
110 wireless communication unit 110
120 carrier sense unit 120
130 storage unit 130
140 control unit 140
200 base station 200
210 wireless communication unit 210
220 storage unit 220
230 control unit 230
30 signal detection range 30

The invention claimed is:

1. A terminal device, comprising:
circuitry configured to
perform wireless communication with a base station that forms a first wireless network;
generate a carrier sense result based on a level of a received carrier signal;
control transmission to a base station, of a threshold change request that requests a change to a signal detection threshold based on the generated carrier sense result; and
control the signal detection threshold so that another terminal device belonging to a second wireless network different from the first wireless network is outside a signal detection range, based on the generated carrier sense result and a response from the base station.

2. The terminal device according to claim 1, wherein the circuitry is further configured to control the wireless communication by transmitting a threshold change request to the base station, the threshold change request signaling that an index related to transmission suppression by the performed carrier sense has exceeded a given threshold.

3. The terminal device according to claim 2, wherein the threshold change request includes identification information of the another device, which is a transmission origin of the received career signal.

4. The terminal device according to claim 2, wherein the threshold change request includes information indicating a measurement result of reception signal intensity measured while performing the carrier sense with the another device.

5. The terminal device according to claim 2, wherein the threshold change request includes information indicating an importance of data subjected to the transmission suppression by the performed carrier sense.

6. The terminal device according to claim 2, wherein the circuitry is further configured to change the signal detection threshold based on a threshold change response, the change to the signal detection threshold being maintained during data transmission that triggered the threshold change request.

7. The terminal device according to claim 1, wherein the circuitry is further configured to control, when having recognized that a signal detection threshold of another terminal device belonging to the first wireless network has been changed based on a threshold change notification received from the base station, a transmission of a threshold change cancellation request to the base station based on a number of times that a given value is exceeded by (i) suppression of data transmission by the carrier sense or (ii) a failure rate of data transmission.

8. The terminal device according to claim 2, wherein the circuitry is further configured to control a transmission of a threshold change cancellation request to the base station when data transmission that triggered the threshold change request has been completed.

9. The terminal device according to claim 2, wherein the circuitry is further configured to
cancel a change of the signal detection threshold when data transmission that triggered the threshold change request has been completed, or
cancel a change of the signal detection threshold based on a threshold change cancellation notification received from the base station.

10. The terminal device according to claim 1, wherein the circuitry is further configured to transmit a threshold change request or a threshold change cancellation request to the base station.

11. The terminal device according to claim 1, wherein the circuitry is further configured to receive a threshold change response, a threshold change notification, or a threshold change cancellation notification from the base station.

12. A base station, comprising:
circuitry configured to
wirelessly communicate with a first wireless network including a first terminal device:
receive, from the first terminal device, a threshold change request that requests a change to a signal detection threshold based on a result of a carrier sense operation; and
transmit, as a reply, a threshold change response for changing the signal detection threshold of the first terminal device so that a second terminal device belonging to a second wireless network different from the first wireless network is outside a signal detection range of the first terminal device, based on the threshold change request received from the first terminal device.

13. The base station according to claim 12, wherein the circuitry is further configured to generate the threshold change response when all of the terminal devices belonging to the first wireless network have higher reception signal intensity at the wireless communication unit than the second terminal device.

14. The base station according to claim 12, wherein the circuitry is further configured to generate the threshold change response when an importance of data subjected to transmission suppression is higher than an importance of data transmitted from any terminal devices of the first wireless network.

15. The base station according to claim 12, wherein the circuitry is further configured to change a signal detection threshold of the base station when the signal detection threshold of the first terminal device is changed.

16. The base station according to claim 12, wherein the circuitry is further configured to control a transmission of a threshold change notification indicating that the first terminal device changes the signal detection threshold to another terminal device belonging to the first wireless network.

17. The base station according to claim 16, wherein the threshold change notification includes identification information of the first terminal device for which the signal detection threshold is changed.

18. The base station according to claim 12, wherein the circuitry is further configured to a transmission of a threshold change cancellation notification to the first terminal device, based on a reception success rate of the base station for receiving wireless signals transmitted from the first terminal device.

19. A non-transitory computer-readable medium storing a program that causes a computer to:
perform wireless communication with a base station that forms a first wireless network;
generate a carrier sense result based on a level of a received carrier signal; and
control a signal detection threshold so that another terminal device belonging to a second wireless network different from the first wireless network is outside a signal detection range, based on the generated carrier sense result.

20. A non-transitory computer-readable medium storing a program that causes a computer to:
perform wireless communication with a first wireless network including a first terminal device;
receive, from the first terminal, a threshold change request that requests a change to a signal detection threshold based on a result of a carrier sense operation; and
transmit, as a reply, a threshold change response for changing a signal detection threshold of the first terminal device so that a second terminal device belonging to a second wireless network different from the first wireless network is outside a signal detection range of the first terminal device, based on the threshold change request received from the first terminal device.

* * * * *